E. SCHILLER.
DOUGH KNEADING MACHINE.
APPLICATION FILED SEPT. 1, 1917.
1,280,313.
Patented Oct. 1, 1918.
3 SHEETS—SHEET 1.
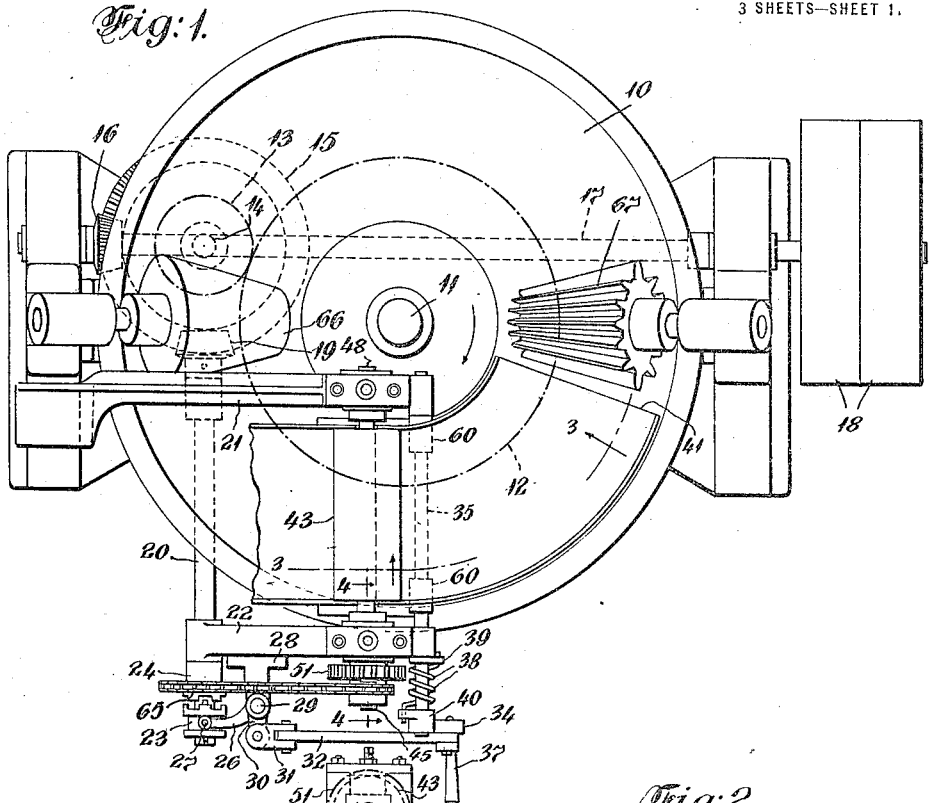
INVENTOR
Eugene Schiller
BY
Howard Freeman
his ATTORNEY

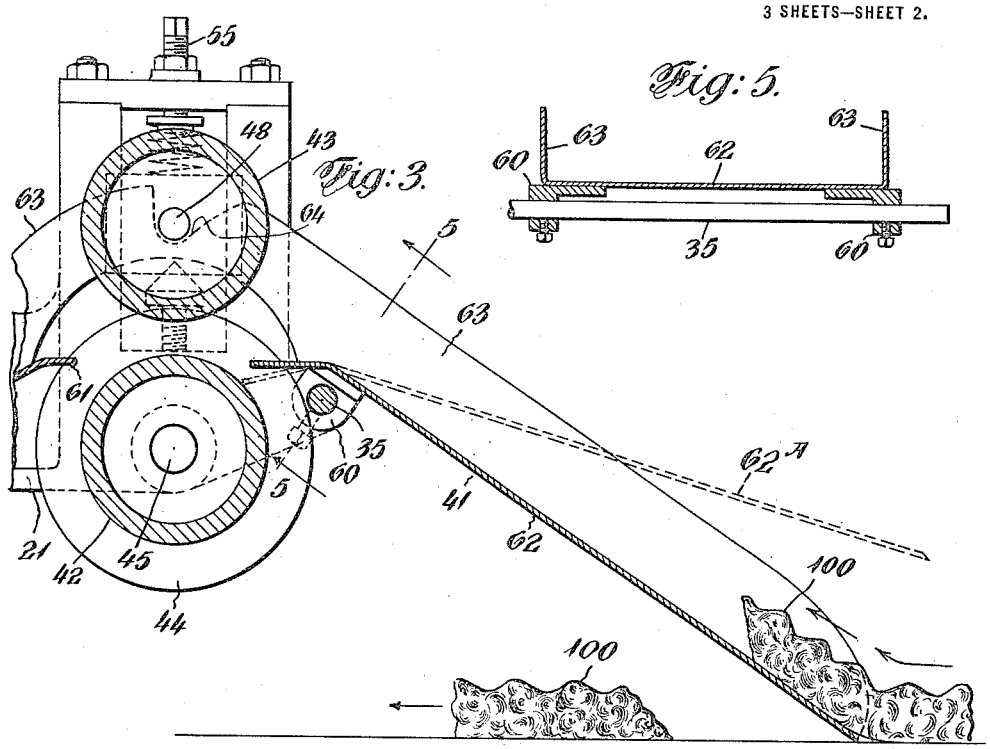
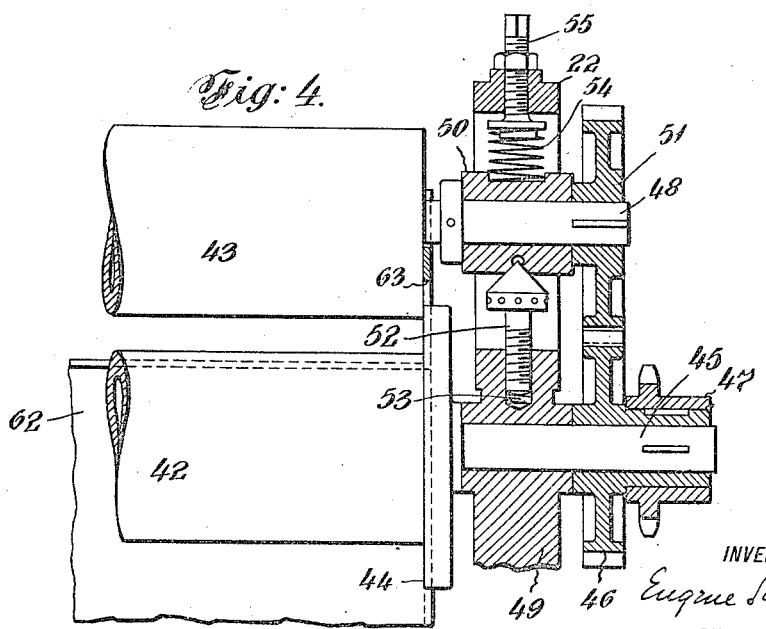

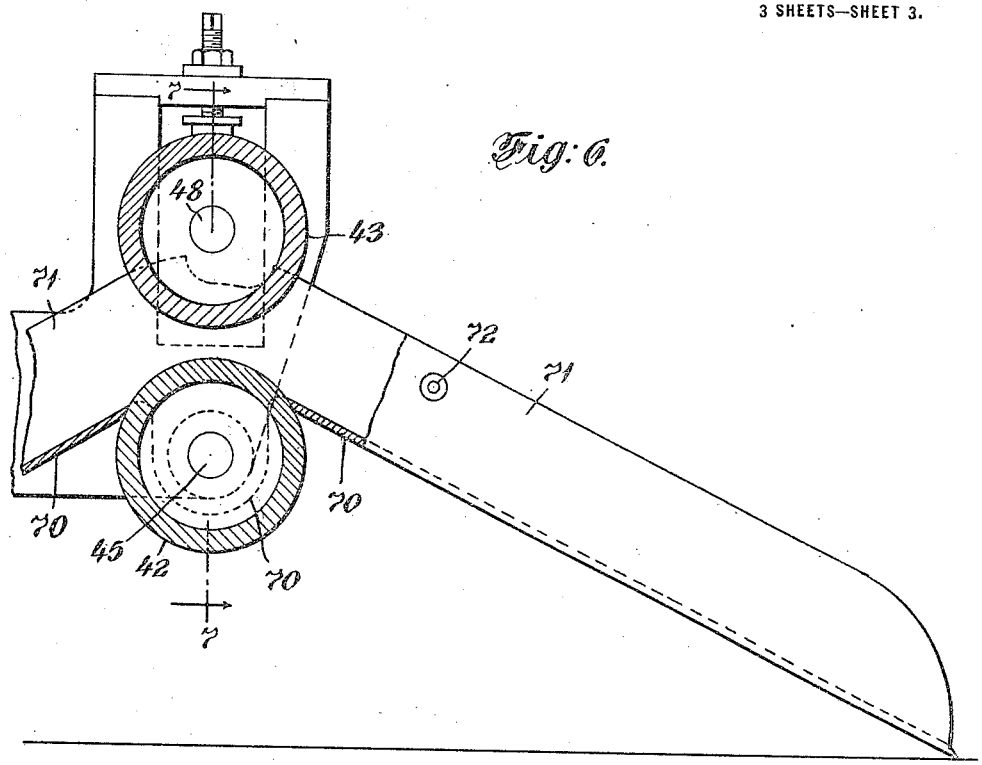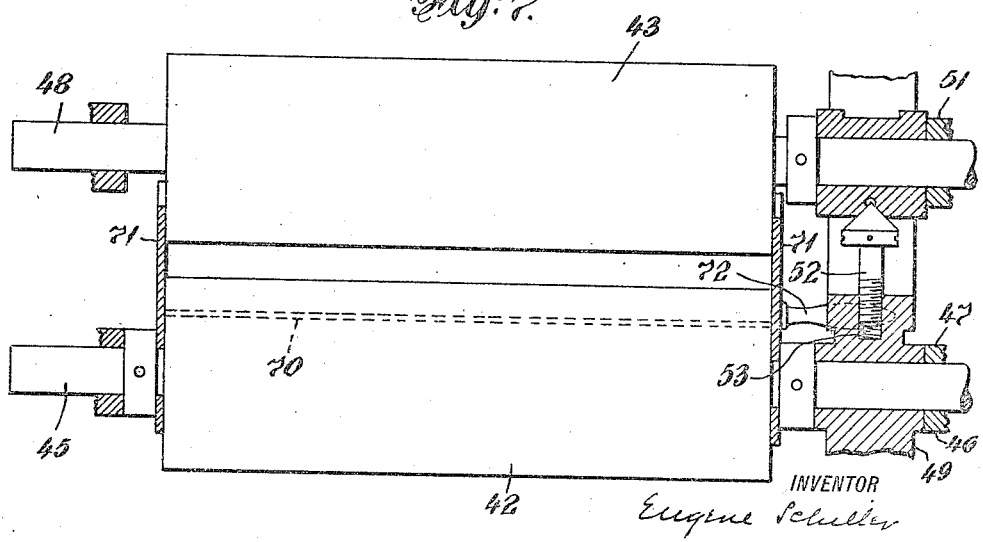

UNITED STATES PATENT OFFICE.

EUGENE SCHILLER, OF NEW YORK, N. Y.

DOUGH-KNEADING MACHINE.

1,280,313.  Specification of Letters Patent.  Patented Oct. 1, 1918.

Application filed September 1, 1917. Serial No. 189,247.

*To all whom it may concern:*

Be it known that I, EUGENE SCHILLER, a citizen of the United States, and a resident of the city of New York, in the county and State of New York, have invented certain new and useful Improvements in Dough-Kneading Machines, of which the following is a specification.

My invention relates to dough kneading machines and refers particularly to a device whereby the dough may be removed from the revolving dough kneader without interrupting the revolution thereof.

One object of my invention is a device whereby dough may be removed from a kneader in one band or strip.

Another object of my invention is a device whereby dough may be removed from a kneader during its revoluble motion.

Another object of my invention is a device whereby dough may be removed mechanically from a kneader without interrupting its movement.

Another object of my invention is a device whereby dough may be removed mechanically from a kneader and delivered in a band or strip of any required thickness and width.

Another object of my invention is a device which will allow a dough kneader to be charged with dough, knead the dough and remove the dough without interrupting the revoluble motion of the kneader.

These and other objects of my invention will be evident upon a consideration of my specifications, drawings and claims.

In the mechanical kneading of dough, it is introduced into a revolving kneading pan and worked by means of revoluble kneading rollers. In the production of dough for certain purposes, such as macaroni, spaghetti and similar goods, it is essential that the dough be removed from the kneader in the form of bands and strips, the effectiveness of the future operations depending largely upon the size and uniformity of such bands and strips. In the removal of the dough from the kneader by the present employed methods, the motion of the kneader is interrupted, the dough band between the two kneading rollers cut out, lifted out by hand and placed upon a truck, the kneader is then given a partial revolution, stopped and another portion of dough cut and removed and this operation repeated as often as necessary. This operation requires the stopping and starting of the kneader three times, the dough is obtained in three or more pieces, considerable labor is required and the dough is liable to be torn and broken during its removal.

The device of my invention overcomes all of these difficulties, as it removes the dough in one piece without danger of tearing and without stopping the kneader. It thus causes a very considerable saving in time and labor and enables the production of improved and superior results.

In the particular form of my device illustrated in the accompanying drawings, similar parts are designated by similar numerals.

Figure 1 is a top plan view of one form of a device of my invention.

Fig. 2 is a side elevation of Fig. 1.

Fig. 3 is a broken development along the line 3—3 of Fig. 1.

Fig. 4 is a broken cross-section through the line 4—4 of Fig. 1.

Fig. 5 is a cross-section through the line 5—5 of Fig. 3.

Fig. 6 is a broken vertical cross-section showing a modified form of the rollers and dough chute.

Fig. 7 is a broken cross-section through the line 7—7 of Fig. 6.

In the particular form of the device of my invention as shown in the accompanying drawings, the revoluble dough kneading pan 10 is fixedly attached to the revoluble shaft 11, carrying the spur gear 12 which meshes with the spur gear 13 fixedly attached to the revoluble shaft 14, which also carries the bevel gear 15. The bevel gear 15 meshes with the bevel gear 16 fixedly attached to the revoluble shaft 17, carrying the fast and loose pulleys 18, 18 which are connected with a source of power not shown. Meshing with the bevel gear 15 is the bevel gear 19 fixedly attached to the shaft 20, which is revolubly supported by the frame 22. The outer extremity of the shaft 20 carries a toothed clutch 24, capable of enmeshment with the toothed clutch 24, loosely mounted upon the shaft 20 and carrying the toothed sprocket 25. Connected with the clutch 23 is a link chain system comprising the link 26, pivotally attached to the clutch 23 at 27, and to the bracket 28 of the frame 22 at 29 and fixedly attached to the link 30. Pivotally attached to the link 30 is the toggle-joint member 31, which in turn is pivotally attached to the member 32 which has the opening 33 at the other end thereof. A lever arm 34 is fixedly attached to a rock shaft 35, revolubly supported by the frames 21 and 22. The arm 34 carries a bolt 36 capable of slidable movement within the opening 33, a handle 37 being attached to the one extremity of the lever arm 34. A spiral spring 38 has one end attached to a fixed portion 39 of the frame 22, the other end of the spring being attached to the collar 40, which is fixedly attached to the rock shaft 35, thus causing the normal position of the chute 41 to be without the kneading pan 10 and the clutches 23 and 24 to be out of mesh. Fixedly attached to the rock shaft 35 is the unloading chute 41, the shape and action of which will be described later. Revolubly housed in the upper portion of the frames 21 and 22 are two rollers 42 and 43. The roller 42 carries a flange 44 and is fixedly attached to the shaft 45 revoluble within the bearing 49, to which are fixedly attached the cogged wheel 46 and the toothed sprocket 47. The roller 43 is fixedly attached to the shaft 48 revoluble within the bearing 50 and carries the cogged wheel 51, capable of deep meshment with the cogged wheel 46. The roller 43 is revoluble between the two flanges 44 of the roller 42. In order to separate the rollers 42 and 43 from each other, a pointed threaded member 52, threads with the threads 53 within the bearing 49, the upper pointed end of the member 52 being revoluble within an inset carried by the bearing 50. By revolving the member 52, the bearings 49 and 50 may be spaced from each other as desired. In order to maintain the rollers at any predetermined distance from each other, a spring 54 is housed between the bearing 50 and the upper portion of the frame 22. The required amount of pressure upon the roller 43 is obtained through the medium of the screw bolt 55 threaded through an opening in the frame 22. Fixedly attached to the rock shaft 35 are the collars 60, 60 carrying the dough chute 41. The dough chute 41 comprises the bottom members 61, 62, spaced from each other between the rollers 42 and 43 in order to allow the rollers to seize and move the dough, and the side members 63, 63 which are integral with the bottoms 61, 62. The side members 63, 63 are cut away at 64 to allow for the rotary movement of the dough chute around the shaft 48, as explained later. The contour of the dough chute 41 agrees with that of the dough kneading pan 10 and is such that the lower edge of the chute is along the radius of revolution of the pan. In the device illustrated the dough chute is sufficiently wide to cover the entire width of the bottom of the dough kneading pan 10, but it is evident that it may be made of a width equal to the width of any dough formed. A chain drive 65 connects the sprockets 25 and 47. Kneading rollers 66 and 67 of the usual construction are within the dough kneading pan 10.

The operation of the device is as follows:—

With the machine in the position shown in Figs. 1 and 2, rotary motion is imparted to the pulleys 18, 18 which revolves the shaft 17, the bevel gears 16 and 15, the spur gears 13 and 12, the shaft 11 and the dough kneading pan 10. When the dough has been sufficiently kneaded by the kneading rollers 66 and 67, the lever handle 37 is drawn backwardly, the lever arm 34, revolving the rock shaft 35 and lowering the lower end of the dough chute 41 into the dough kneading pan 10 and through the dough 100 as shown in Fig. 3. The continued movement of the handle 37, moves the bolt 36 along the opening 33 to the end thereof and then moves the link chain 32, 31, 30 and 26, meshing the clutches 23 and 24, imparting revolution to the sprocket 25, the chain drive 65, the sprocket 47 and the two rollers 42 and 43. The revolution of the dough kneading pan 10 will force the dough upwardly within the dough chute 41, when it will be gripped by the rollers 42 and 43, drawn upwardly within the chute and passed over the bottom 61 of the chute into any desired receptacle, not shown. The handle 37 is maintained in this position during the removal of the dough, its release removing the chute 41 from the pan 10, and unmeshing the clutches 23 and 24. When the kneading pan 10 has made one revolution, all of the dough will have been removed therefrom, the lever handle 37 is released, raising the chute 41 into the position shown in dotted lines 62^A, Fig. 3, at the same time unmeshing the clutches 23 and 24 and thus interrupting the revolution of the rollers 42 and 43. The dough kneading pan may now be charged with a new batch of dough, the charging, kneading and removing of the dough thus being accomplished without stopping the revolution of the kneading pan.

In the modification shown in Figs. 6 and 7, the roller 42 has no flange and the dough chute comprising the bottom 70 and the side walls 71, 71 is revoluble around the shaft 45 of the roller 42. A handle 72 is attached to the dough chute to facilitate its movement, and the other end carries a counter-balance to maintain the chute in its normal condition in a raised position out of contact with the bottom of the dough kneading pan. It is evident that the dough chute may be moved in conjunction with the revolution of the rollers 42, 43 in a manner similar to that already described or may be arranged to move independently thereof. The rollers may be revolved in the same manner as previously described or in any other suitable manner. The sides 71, 71 of the chute are in abuttable contact with the ends of the rollers 42, 43 in order that the dough may not pass outwardly beyond the ends of the rollers and thus escape their compressing action.

I do not limit myself to the particular size, shape, numbers or arrangement of parts, all of which may be varied without going beyond the scope of my invention as described and claimed.

What I claim is:—

1. In a dough kneading machine, in combination, a revoluble dough kneading pan, means for revolving the pan, a removable dough chute capable of being lowered into the kneading pan whereby the revolution of the kneading pan will cause the dough within the pan to be removed through the chute, and means exterior of the pan whereby the dough will be converted into strips of uniform thickness.

2. In a dough kneading machine, in combination, a revoluble dough kneading pan, means for revolving the pan, a removable dough chute capable of being lowered into the kneading pan causing dough within the pan to pass through the chute to rollers, rollers capable of converting the dough into strips of uniform thickness, a receptacle and means whereby the rollers will deliver the dough from the chute to the receptacle.

3. In a dough kneading machine, in combination, a revoluble dough kneading pan, means for revolving the pan, a removable dough chute capable of being lowered into the kneading pan, a pair of rollers intermediate of the chute, means for spacing the rollers with respect to each other, means for revolving the rollers, means whereby the chute may be lowered into the pan during the revolution of the latter whereby the revolution of the pan will cause dough therein to rise in the chute to the rollers.

4. In a dough kneading machine, in combination, a revoluble dough kneading pan, means for revolving the pan, a removable dough chute capable of being lowered into the kneading pan, a pair of rollers intermediate of the chute, means for spacing the rollers with respect to each other, means for causing a pressure upon one of the rollers, link means whereby the chute may be lowered into the pan and the rollers revolved whereby dough within the pan may be delivered through the chute to the rollers.

5. In a dough kneading machine, in combination, a revoluble dough kneading pan, means for revolving the pan, a removable dough chute capable of being lowered into the kneading pan, a pair of rollers capable of converting the dough into strips of uniform thickness intermediate of the chute and means for rotating the rollers upon lowering the chute into the pan.

Signed at New York city, in the county of New York and State of New York, this 29th day of August, 1917.

EUGENE SCHILLER.

Copies of this patent may be obtained for five cents each, by addressing the "Commissioner of Patents, Washington, D. C."